Aug. 17, 1965
W. S. REYNOLDS
3,201,658
CONTROL RELAY CIRCUIT
Filed March 9, 1962
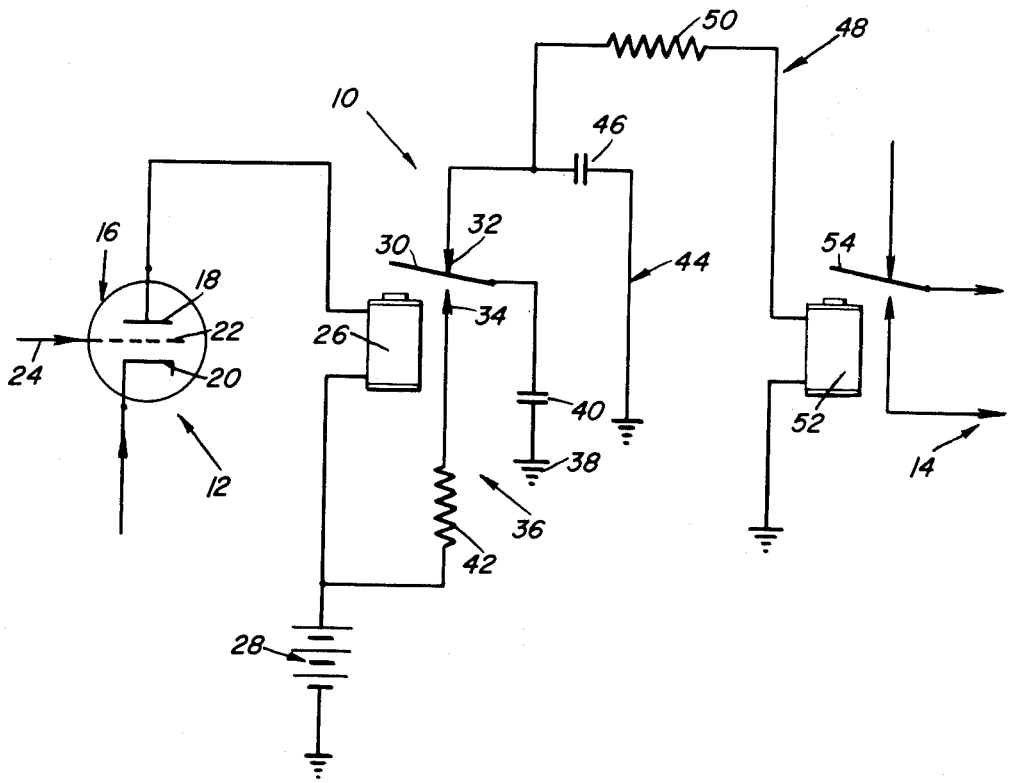
Willard S. Reynolds
INVENTOR.
BY *[signatures]*
Attorneys United States Patent Office 3,201,658
Patented Aug. 17, 1965

3,201,658
CONTROL RELAY CIRCUIT
Willard S. Reynolds, Hollywood, Fla., assignor to Telectron Company, Division of Elliott & Evans, Inc., Fort Lauderdale, Fla., a corporation of Ohio
Filed Mar. 9, 1962, Ser. No. 178,773
3 Claims. (Cl. 317—151)

This invention relates to a relay control system for signal responsive control of externally controlled circuits.

In particular, the relay control system of the present invention is useful in connection with relay signals derived from extremely sensitive devices such as remote control devices for radio control systems where it becomes necessary to use relays in the plate or output circuit of a tube, semi-conductor device or other current controlling elements.

In practice, the proper operation of such relay control systems is often marred by defective components, shorted tubes, defective transistors, leaky capacitors and as a result of many other causes or malfunctions. In such cases, operation of the relay control system may persist to a certain extent causing serious damage or injury. It is therefore a primary object of the present invention to provide a relay control system which is not only responsive to signals derived from sensitive receiving equipment, but also immediately disabled in response to malfunction of any associated equipment or any components within the relay system itself to thereby prevent damage to the remaining components or associated equipment.

In accordance with the foregoing objects, the relay control system of the present invention employs a novel circuitry which avoids any possibility of undesired phantom operation of the relay control system. The novel circuitry involved the energization of a control relay coil for the external circuit relay switch that is energized solely from a source of potential made available from a storage capacitor within after a predetermined energy level is accumulated. Accumulation of the charge within the storage capacitor is in turn under the control of a charge transferring arrangement which will be inoperative in the event of any malfunction in the relay triggering circuits or in the relay system itself so as to prevent the accumulation of the charge in the storage capacitor necessary to energize the control relay.

These together with other objects and advantages which will become subsequently apparent reside in the details of construction and operation as more fully hereinafter described and claimed, reference being had to the accomapnying drawings forming a part hereof, wherein like numerals refer to like parts throughout.

Referring now to the drawing in detail, it will be observed that the relay system generally referred to by reference numeral 10 is interconnected between a relay signal circuit generally referred to by reference numeral 12 and an externally controlled circuit generally referred to by reference numeral 14. It will be appreciated, that the relay signal circuit may be of any suitable type although the relay control system 10 is particularly useful in connection with a circuit forming part of a sensitive type of electronic equipment that may become damaged as a result of malfunction either in the relay triggering signal or in the operation of the relay system itself. Accordingly, the relay control system 10 is adapted to be connected to the plate circuit of the current control device 16 of the relay signal circuit 12. The current control device may be of any suitable form such as electronic tubes or semi-conductor devices. In the example illustrated, the current control device 16 is in the form of a tube having a plate element 18, a cathode 20 and a control grid 22 operative to render the device 16 conductive when a signal voltage is applied to the control grid 22 through the input signal lead 24. Connected in the plate circuit, is a signal responsive relay coil device 26 while the plate circuit is provided with a bias source of potential 28. It will therefore be apparent, that when the current control device 16 is rendered conductive by an input signal applied to the control grid 22, energizing current will flow in the plate circuit so as to actuate the relay switch 30 from the discharge position thereof as illustrated in the drawing to a charge position. The relay switch 30 is therefore of the single pole double throw type adapted to contact the fixed contacts 32 and 34 in the charge and discharge positions of the switch respectively. The relay switch 30 will therefore be actuated between its two positions intermittently in response to relay triggering signals in the circuit 12 to which the relay coil 26 responds.

A charge transferring circuit generally referred to by reference numeral 36 is operatively interconnected between ground 38 and the source of potential 28. The circuit 36 therefore includes a charge transferring capacitor 40 connected to ground 38 at its negative terminal while its positive terminal is connected to the relay switch 30. The relay switch 30 in its charge position engaging the contact 34, is connected through a voltage dropping resistor 42 to the relay coil 26 through which energizing current flows when a signal is detected by tube 16. The resistor 42 is therefore operative to limit the charge applied to the capacitor 40 by the energizing current during energization of relay coil 26 when the switch 30 is in contact with the contact element 34. Interruption of the signal applied to the signal circuit 12 will therefore cause deenergization of the delay coil 26 whereupon the switch 30 returns to its position in contact with the contact element 32 so that the capacitor 40 can no longer be charged but instead discharges into an energy storage circuit generally referred to by reference numeral 44.

The energy storage circuit 44 includes a charge storing capacitor 46 the negative terminal of which is grounded and the positive terminal of which is connected to the fixed contact element 32. It will be appreciated that the capacitor 46 has a substantially larger capacity than the capacitor 40 inasmuch as it is adapted to accumulate repeated charges applied thereto by discharge from the capacitor 40.

The discharge from the storage capacitor 46 into the relay control circuit 48 is controlled by current limiting resistor 50. The control relay circuit 48 is therefore a grounded circuit connected between the positive terminal of the capacitor 46 and the contact 32 and including the resistor 50 in series with the control relay coil 52. It will be apparent, that the potential source for the control relay circuit 48 is the storage capacitor 46 operative to supply energizing current through the control relay coil 52 when a predetermined charge is accumulated there within. Energization of the control relay coil 52 will of course actuate the relay switch 54 controlling the external circuit 14 to which it is connected.

Operation of the relay control system of the present invention may therefore be summarized by considering what occurs when the current controlling device 16 is rendered conductive by an input signal from lead 24. As a result thereof, the relay coil 26 is energized causing the relay switch 30 to engage the contact 34. The capacitor 40 accordingly is supplied with a partial charge limited by the resistor 42. When the relay triggering signal is interrupted, de-energization of the relay coil 26 permits the relay switch 30 to return into contact with the contact element 32. The charge acquired by the capacitor 40 is thereby transferred to the capacitor 46. The capacitor 46 is therefore at this point in possession of a fractional part of its full charge. A rapid repetition of the foregoing operation will therefore intermittently add further charges to the capacitor 46 until the potential thereacross is of a sufficient level to produce an energizing current in the control circuit 48. It will therefore be apparent, that the signal frequency or rate of signal interruption necessary to effect operation of relay 52, will be controlled by the charge limiting resistor 42 and the discharge rate of the capacitor 46 as controlled by the current limiting resistor 50. For example, if the rate of signal interruptions is too rapid, the capacitor 40 will not charge sufficiently through resistor 42 for transferring charges to the capacitor 46 at a rate sufficient to allow an increase in the charge to be accumulated in the capacitor 46. If on the other hand, the rate of signal interruptions is too slow, the capacitor 46 will be discharging through the resistor 50 at a faster rate than it is receiving charges from the capacitor 40. Consequently, there will be no operation of the relay 52 in either case so as to limit timing of the signal to a predetermined range. With properly designed values governing the aforementioned limits and with an equivalent rate of signal repetition or interruption incorporated into the relay triggering circuit of the associated equipment, the possibility of false relay triggering from interference sources is reduced to a minimum.

Further consideration of the relay control system of the present invention will also make it apparent that operation thereof will not occur should malfunction occur for any reason. For example, should a leak or a short circuit develope in the current control tube 16, the relay switch be energized and remain energized so that the relay switch 30 will remain out of contact with the contact element 32. No transfer of charge to the storage capacitor 46 will occur to thereby positively prevent operation of the relay 52. Should the capacitor 40 become shorted, it would receive no charge and hence no charge could be transferred to the capacitor 46 in order to acquire a sufficient energizing charge. On the other hand, should the capacitor 40 become open, it will again receive no charge for transferring purposes. The storage capacitor 46 on the other hand if in a shorted or opened condition, would also prevent energization of the control relay 52. It will therefore be appreciated from the foregoing, that the relay 52 can only be energized by energy transferred to it by the proper pulsation of the signal responsive relay 26 and is at no time connected to any other power source. The signal interruption rate and corresponding value of the circuit components may be set to suit the application demand and safety factors desired. In general use, this would be in the order of 10 cycles per second with the receiver set up to function on the sixth pulse. In certain special applications, the rate of pulses can be set as low as one pulse in ten seconds or slower.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination with an output circuit of a current control device rendered conductive by an input signal, a source of potential for said output circuit, an external control circuit, and a relay system for closing said external control circuit in response to input signals to the current control device, said relay system comprising, a signal relay coil in said output circuit energized when said current control device is rendered conductive, relay switch means actuated from a discharge position to a charged position upon energization of said relay coil, a grounded charge transferring capacitor connected to said relay switch means, a voltage dropping resistor connected between said source of potential and the relay switch means in the charge position to limit charging of the charge transferring capacitor, a grounded storage capacitor connected to the relay switch means in the discharge position thereof for accumulating charges from the charge transferring capacitor, grounded relay circuit means operatively connected by a current limiting resistor to the storage capacitor, and control relay means operatively connecting said relay circuit means to the external control circuit for closing thereof.

2. In combination with a relay load circuit and a source of potential, energy storage means connected to the load circuit for supply of energizing current thereto, energy transfer means having a transfer capacitor normally connected to the storage means in a discharged state, signal responsive means intermittently conducting current, charging circuit means connected in parallel with said signal responsive means to said source of potential for charging the transfer capacitor, and means responsive to flow of said intermittently conducted current in the signal responsive means for simultaneously connecting the transfer means to the charging circuit means and disconnecting the storage means therefrom.

3. In combination with a relay load circuit, a storage capacitor connected to the load circuit for energization of the load circuit upon accumulation of a predetermined charge by the storage capacitor, a transfer capacitor normally connected to the storage capacitor to prevent accumulation of a charge in the storage capacitor, a signal operated device intermittently conducting current, current responsive relay means connected to the signal operated device for energization in response to flow of said current, a charge limiting resistor connected to the current responsive relay means for conducting charging current, and switch means responsive to energization of the current responsive relay means for connecting the transfer capacitor to the charge limiting resistor to receive a fractional part of said predetermined charge subsequently transferred to the storage capacitor upon denergization of the current responsive relay means.

References Cited by the Examiner

UNITED STATES PATENTS 2,859,960   11/58   Magondeaux _____ 317—151 X

SAMUEL BERNSTEIN, *Primary Examiner.*

MAX L. LEVY, *Examiner.*